United States Patent
Yee et al.

(10) Patent No.: US 11,833,807 B2
(45) Date of Patent: Dec. 5, 2023

(54) FLEXIBLE PACKAGING FILM LAMINATES AND METHOD OF MAKING SAME VIA THERMAL LAMINATION

(71) Applicant: Dow Global Technologies LLC, Midland, MI (US)

(72) Inventors: Wu Aik Yee, Singapore (SG); Edward L. Lee, Singapore (SG); Hwee Tatz Thai, Singapore (SG); Hwee Lun Goh, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 69 days.

(21) Appl. No.: 17/622,586

(22) PCT Filed: Jun. 24, 2020

(86) PCT No.: PCT/US2020/039230
§ 371 (c)(1),
(2) Date: Dec. 23, 2021

(87) PCT Pub. No.: WO2020/263884
PCT Pub. Date: Dec. 30, 2020

(65) Prior Publication Data
US 2022/0355574 A1 Nov. 10, 2022

Related U.S. Application Data

(60) Provisional application No. 62/867,979, filed on Jun. 28, 2019.

(51) Int. Cl.
| | |
|---|---|
| *B32B 7/12* | (2006.01) |
| *B32B 15/085* | (2006.01) |
| *B32B 15/20* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B65D 65/02* | (2006.01) |
| *B65D 65/40* | (2006.01) |
| *C08L 23/08* | (2006.01) |
| *C08L 51/06* | (2006.01) |

(52) U.S. Cl.
CPC .............. *B32B 7/12* (2013.01); *B32B 15/085* (2013.01); *B32B 15/20* (2013.01); *B32B 27/08* (2013.01); *B32B 27/302* (2013.01); *B32B 27/308* (2013.01); *B32B 27/32* (2013.01); *B32B 27/34* (2013.01); *B32B 27/36* (2013.01); *B65D 65/02* (2013.01); *B65D 65/40* (2013.01); *C08L 23/0869* (2013.01); *C08L 51/06* (2013.01); *B32B 2250/03* (2013.01); *B32B 2250/24* (2013.01); *B32B 2250/40* (2013.01); *B32B 2270/00* (2013.01); *B32B 2307/30* (2013.01); *B32B 2307/31* (2013.01); *B32B 2307/516* (2013.01); *B32B 2307/518* (2013.01); *B32B 2307/72* (2013.01); *B32B 2439/70* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 3,264,272 | A | 8/1966 | Watkin Rees |
| 3,645,992 | A | 2/1972 | Elston |
| 3,914,342 | A | 10/1975 | Mitchell |
| 4,076,698 | A | 2/1978 | Anderson et al. |
| 4,599,392 | A | 7/1986 | McKinney et al. |
| 4,629,657 | A | 12/1986 | Gulati et al. |
| 4,762,748 | A | 8/1988 | Oberle |
| 4,766,174 | A | 8/1988 | Statz |
| 4,853,265 | A | 8/1989 | Warren |
| 4,957,820 | A * | 9/1990 | Heyes .................... B32B 15/08 428/458 |
| 5,272,236 | A | 12/1993 | Lai et al. |
| 5,278,272 | A | 1/1994 | Lai et al. |
| 5,298,326 | A | 3/1994 | Norpoth et al. |
| 5,462,807 | A | 10/1995 | Halle et al. |
| 5,582,923 | A | 12/1996 | Kale et al. |
| 5,733,155 | A | 3/1998 | Sagawa |
| 5,854,045 | A | 12/1998 | Fang et al. |
| 5,922,164 | A | 7/1999 | Kimura et al. |
| 6,153,298 | A | 11/2000 | Joson |
| 7,281,360 | B1 | 10/2007 | Larimore et al. |
| 7,611,770 | B2 | 11/2009 | Kennedy et al. |
| 8,356,459 | B1 | 1/2013 | Larimore et al. |

(Continued)

FOREIGN PATENT DOCUMENTS

| | | |
|---|---|---|
| CA | 2233948 C | 1/2007 |
| EP | 402004 A1 | 12/1990 |

(Continued)

OTHER PUBLICATIONS

International Search Report & Written Opinion dated Aug. 24, 2020 in PCT Application No. PCT/US2020/039230.
International Search Report and Written Opinion dated Sep. 8, 2020 in PCT Application No. PCT/US2020/039233.
Communication 161/162 Pertaining to Application No. 20742535.6, dated Feb. 11, 2022.

(Continued)

*Primary Examiner* — John Vincent Lawler

(74) *Attorney, Agent, or Firm* — Dinsmore & Shohl LLP

(57) ABSTRACT

Multilayer film embodiments are directed to films produced via thermal lamination without adhesive due to the use of tie layers comprising a blend of ethylene acrylate copolymer and an anhydride grafted ethylene α-olefin copolymer.

17 Claims, No Drawings

(56) References Cited

U.S. PATENT DOCUMENTS

| | | | |
|---|---|---|---|
| 9,005,739 B2 | 4/2015 | Van Den Bossche et al. | |
| 2009/0035594 A1* | 2/2009 | Lee .................... | B32B 27/34 |
| | | | 525/74 |
| 2012/0077048 A1* | 3/2012 | Botros ................. | B32B 7/12 |
| | | | 525/70 |
| 2014/0147644 A1* | 5/2014 | Crabb .................. | B32B 27/36 |
| | | | 428/424.4 |
| 2015/0336365 A1* | 11/2015 | Kupsch ................ | B32B 27/34 |
| | | | 428/483 |
| 2017/0066228 A1* | 3/2017 | Fusarpoli ............. | B32B 27/304 |
| 2019/0134961 A1* | 5/2019 | Stafyla ................ | B65D 65/40 |
| 2019/0143643 A1* | 5/2019 | Broyles ............... | B32B 27/08 |
| | | | 428/339 |
| 2020/0377276 A1* | 12/2020 | Michaud .............. | B32B 27/36 |

FOREIGN PATENT DOCUMENTS

| | | | | |
|---|---|---|---|---|
| WO | 2011029950 A1 | 3/2011 | | |
| WO | 2016050686 A1 | 4/2016 | | |
| WO | WO-2016050686 A1 * | 4/2016 | ............ | B32B 27/08 |
| WO | 2017071750 A1 | 5/2017 | | |
| WO | 2017099915 A1 | 6/2017 | | |
| WO | 2018019392 A1 | 2/2018 | | |
| WO | 2019041176 A1 | 3/2019 | | |

OTHER PUBLICATIONS

Communication 161/162 Pertaining to Application No. 20742536.4, dated Feb. 11, 2022.
U.S. Non-Final Office Action dated Jun. 2, 2023, pertaining to U.S. Appl. No. 17/622,521, 20 pgs.

* cited by examiner

FLEXIBLE PACKAGING FILM LAMINATES AND METHOD OF MAKING SAME VIA THERMAL LAMINATION

CROSS-REFERENCE TO RELATED APPLICATIONS

This application is a National Stage Entry under 35 U.S.C. § 371 of International Patent Application No. PCT/US2020/039230, filed Jun. 24, 2020, which claims priority to U.S. Provisional Patent Application No. 62/867,979, filed on Jun. 28, 2019, the entire disclosures of both of which are hereby incorporated by reference.

TECHNICAL FIELD

Embodiments of the present disclosure are generally related to multilayer films, and are more particularly related to multilayer films and laminates produced without adhesives.

BACKGROUND

Multilayer films can include films such as cast films or blown films, which may be suitable for flexible packages such as sachets or pouches for various consumer products. Conventional laminates used in such applications typically include one or more layers of polyethylene terephthalate (PET) or biaxially oriented polypropylene (BOPP) laminated to a polyethylene sealant substrate. Although such structures are printable, heat-resistant, and able to withstand high temperature sealing for good seal integrity, such laminates are unable to be recycled.

Although mono-material polyethylene multilayer films have been introduced in order to address the recyclability issue, they typically lack the heat resistance needed for use in high temperature sealing high speed packaging machines, which can result in distorted printing. Additionally or alternatively, such films can have limited stiffness, scuff resistance, tensile strength, and gloss. Moreover, the use of laminating adhesives to enable the adhesion of the package to ink, can limit recyclability.

Accordingly, there is a need to develop mono-material polyethylene multilayer films having suitable heat resistance without including laminating adhesives.

SUMMARY

The present compositions meet these needs by providing films having a tie layer comprising a blend having ethylene acrylate copolymer, and an anhydride grafted ethylene α-olefin copolymer.

According to at least one embodiment of the present disclosure, a multilayer film is provided. The multilayer film comprises a first layer, a second layer, and a tie layer positioned between the first layer and the second layer, the tie layer comprising a blend having ethylene acrylate copolymer, and an anhydride grafted ethylene α-olefin copolymer. At least one of the first layer and the second layer are individually selected from the group consisting of polypropylene (PP), polyethylene terephthalate (PET), polyethylene (PE), polyamide (PA), aluminum, and combinations thereof.

These and other embodiments are described in more detail in the following detailed description.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

The term "LLDPE" includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.945 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.945 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.909 g/cc, which are generally prepared with Ziegler-Natta catalysts, single-site catalysts including, but not limited to, bis-metallocene catalysts and constrained geometry catalysts, and post-metallocene, molecular catalysts. The term "propylene-based polymer," as used herein, refers to a polymer that comprises, in polymerized form, refers to polymers comprising greater than 50% by weight of units which have been derived from propylene monomer. This includes propylene homopolymer, random copolymer polypropylene, impact copolymer polypropylene, propylene/?-olefin interpolymer, and propylene/?-olefin copolymer. These polypropylene materials are generally known in the art.

"Multilayer film" means any structure having more than one layer. For example, the multilayer structure may have two, three, four, five or more layers. A multilayer film may be described as having the layers designated with letters. For example, a three layer structure having a core layer B, and two external layers A and C may be designated as A/B/C. Likewise, a structure having two core layers B and C and two external layers A and D would be designated A/B/C/D. Additionally, the skilled person would know that further layers E, F, G, etc. may also be incorporated into this structure.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

Reference will now be made in detail to multilayer film embodiments of the present disclosure, wherein the multilayer film comprises a first layer, a second layer, and a tie layer positioned between the first layer and the second layer, the tie layer comprising a blend having ethylene acrylate copolymer, and an anhydride grafted ethylene α-olefin copolymer. At least one of the first layer and the second layer are individually selected from the group consisting of polypropylene (PP), polyethylene terephthalate (PET), polyethylene (PE), polyamide (PA), aluminum, and combinations thereof.

In one embodiment, only one of the first layer and the second layer comprise PP, PET, PE, PA, aluminum, and combinations thereof. In another embodiment, the first layer and the second layer may both be selected from the group consisting of PP, PET, PE, PA, aluminum, and combinations thereof. In yet another embodiment, the first layer or second layer may comprise a PE sealant layer. The PE sealant layer may comprise a monolayer or multilayer, for example, a coextruded multilayer film having from 2 to 11 layers. The PE sealant layer may include LDPE, LLDPE, ethylene acid copolymers, ionomers, ethylene vinyl acetate, polyamide, ethylene vinyl alcohol, or combinations thereof. In further embodiments, at least one of the first layer and the second layer are uniaxially oriented or biaxially oriented.

Tie Layer

The ethylene acrylate copolymer within the tie layer blend may include various suitable compositions. In some embodiments, the tie layer includes an ethylene acrylate copolymer. The ethylene acrylate copolymer is a polymerized reaction product of ethylene and one or more acrylate comonomers. Suitable ethylene acrylate copolymers may include ethylene (meth)acrylate (EMA), ethylene ethyl acrylate (EEA), and ethylene butyl acrylate (EBA). In a specific embodiment, the ethylene acrylate copolymer comprises ethylene (meth)acrylate.

The ethylene acrylate copolymer may have a density of from 0.920 to 0.950 g/cc, or from 0.925 to 0.945 g/cc. Moreover, the ethylene acid copolymer has a melt index ($I_2$) of from 1.0 g/10 min to 5 g/10 min, from 1.5 g/10 min to 2.5 g/10 min.

In one or more embodiments, the ethylene acrylate copolymer has an acrylate comonomer content from 5 to 40% by weight, from 15 wt. % to 40 wt. %, or from 20 wt. % to 30 wt. %. Conversely, in one or more embodiments, the ethylene acrylate copolymer has greater than 50% wt. of ethylene monomer, greater than 60% by wt. of ethylene monomer, or greater than 70% by wt. of ethylene monomer.

Various amounts of the ethylene acrylate copolymer are contemplated within the blend. In one or more embodiments, the blend may comprise from 50 to 90% by weight of ethylene acrylate copolymer, or from 60 to 90% by weight, from 70 to 85% by weight, or from 70 to 80% by weight of ethylene acrylate copolymer.

The anhydride grafted ethylene α-olefin copolymer within the tie layer blend may also include various suitable copolymer compositions. Suitable α-olefin examples, which may be either aliphatic or aromatic, may include $C_3$-$C_{20}$ α-olefins, $C_3$-$C_{16}$ α-olefins, or $C_3$-$C_{10}$ α-olefins. In one or more embodiments, the α-olefin may be a $C_3$-$C_{10}$ aliphatic α-olefin selected from the group consisting of propylene, 1-butene, 1-hexene and 1-octene.

The anhydride grafted ethylene-based polymer has a density from 0.880 to 0.930 g/cc, from 0.900 to 0.930 g/cc, or from 0.910 to 0.925 g/cc. In some embodiments, the anhydride grafted ethylene-based polymer has a melt flow rate from 0.1 g/10 min to 50 g/10 min, or from 0.5 g/10 min to 20 g/10 min, or from 1.0 g/10 min to 10 g/10 min, or from 2.0 to 5 g/10 min.

Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the anhydride grafting moiety comprises maleic anhydride. The anhydride grafted ethylene α-olefin copolymer may have an anhydride grafting level from 0.1 to 2.5 wt. %.

Various amounts of the anhydride grafted ethylene α-olefin copolymer are contemplated within the blend. The blend may comprise from 5 to 45% by weight of anhydride grafted ethylene α-olefin copolymer. In further embodiments, the blend may comprise 5 to 20% by weight anhydride grafted ethylene α-olefin copolymer, or from 5 to 20% by weight anhydride grafted ethylene α-olefin copolymer.

Optionally, the blend may further comprise ethylene/α-olefin/non-conjugated diene interpolymer. The ethylene/α-olefin/non-conjugated diene interpolymer may comprise one or more interpolymers, where each ethylene/α-olefin/non-conjugated diene interpolymer comprises in polymerized form, ethylene, an α-olefin, and a non-conjugated diene. In specific embodiments, the ethylene/α-olefin/non-conjugated diene interpolymer is a terpolymer.

Suitable α-olefin examples, which may be either aliphatic or aromatic, may include $C_3$-$C_{20}$ α-olefins, $C_3$-$C_{16}$ α-olefins, or $C_3$-$C_{10}$ α-olefins. In one or more embodiments, the α-olefin may be a $C_3$-$C_{10}$ aliphatic α-olefin selected from the group consisting of propylene, 1-butene, 1-hexene and 1-octene. In one embodiment, the α-olefin is propylene.

Suitable examples of non-conjugated dienes include $C_4$-$C_{40}$ non-conjugated dienes. Illustrative non-conjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclo-dodecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propeny1-2-norbornene, 5-isopropylidene-2-norbornene, 5-(4-cyclopentenyl)-2-norbornene, and 5-cyclohexylidene-2-norbornene. In specific embodiments, the non-conjugated diene is selected from the group consisting of ENB, dicyclopentadiene, 1,4-hexadiene, 7-methyl-1,6-octadiene, preferably ENB, dicyclopentadiene and 1,4-hexadiene, more preferably ENB and dicyclopentadiene, and even more preferably ENB.

In further embodiments, the ethylene/α-olefin/non-conjugated diene interpolymer is ethylene-propylene-diene terpolymer (EPDM), specifically a terpolymer product of ethylene, propylene and ENB.

Various amounts of each monomer are contemplated in the ethylene/α-olefin/non-conjugated diene interpolymer; however, the interpolymer comprises a majority amount of polymerized ethylene. In one or more embodiments, the ethylene/α-olefin/non-conjugated diene interpolymer comprises, based on the overall weight of the ethylene/α-olefin/non-conjugated diene interpolymer, from 50 to 80 wt. % ethylene, from 55 to 75 wt. % ethylene, or from 60 to 70 wt. % ethylene. Similarly, the ethylene/α-olefin/non-conjugated diene interpolymer comprises, based on the overall weight of ethylene/α-olefin/non-conjugated diene interpolymer, from 15 to 45 wt. % propylene, from 20 to 40 wt. % propylene, or from 25 to 35 wt. % propylene. Further, the ethylene/α-olefin/non-conjugated diene interpolymer comprises, based on the overall weight of ethylene/α-olefin/non-conjugated diene interpolymer, from 0.1 to 10 wt. % non-conjugated diene, from 0.1 to 5 wt. % non-conjugated diene, or from 0.1 to 1 wt. % non-conjugated diene.

In one or more embodiments, the ethylene/α-olefin/non-conjugated diene interpolymer has a crystallinity from 7 to 20% as measured by Differential Scanning calorimetry. In further embodiments, the crystallinity is from 8 to 18, from 10 to 15, or from 12 to 15.

Additionally, the ethylene/α-olefin/non-conjugated diene interpolymer may be characterized by a Mooney Viscosity ($ML_{1+4}$) of 5 to 50, or 10 to 40, or 15 to 30, wherein Mooney Viscosity ($ML_{1+4}$) is measured according to ASTM D1646.

The ethylene/α-olefin/non-conjugated diene interpolymer may have a weight average molecular weight (Mw) as measured according to conventional gel permeation chromatography (GPC) of at least 90,000 g/mole, at least 100,000 g/mole, at least 110,000 g/mole, at least 120,000 g/mole, at least 200,000 g/mole, at least 220,000 g/mole, or at least 240,000 g/mole, or at least 260,000 g/mole, or at least 280,000 g/mole. Moreover, the ethylene/α-olefin/non-conjugated diene interpolymer may have a weight average molecular weight (Mw) less than, or equal to, 500,000 g/mole, or less than, or equal to, 450,000 g/mole, or less than, or equal to, 400,000 g/mole, or less than, or equal to, 250,000 g/mole, or less than, or equal to, 200,000 g/mole, or less than, or equal to, 150,000 g/mole.

Moreover, the ethylene/α-olefin/non-conjugated diene interpolymer may have a number average molecular weight (Mn) greater than, or equal to, 20,000 g/mole, or greater than, or equal to, 25,000 g/mole, or greater than, or equal to, 30,000 g/mole. In one or more embodiments, the ethylene/α-olefin/non-conjugated diene interpolymer has a number average molecular weight (Mn) less than, or equal to, 60,000 g/mole, or less than, or equal to, 55,000 g/mole, or less than, or equal to, 50,000 g/mole, or less than, or equal to, 40,000 g/mole.

As stated above, the ethylene/α-olefin/non-conjugated diene interpolymer may have a molecular weight distribution (MWD) of at least 2.5, wherein MWD=Mw/Mn. Moreover, the ethylene/α-olefin/non-conjugated diene interpolymer may have an MWD less than, or equal to, 10.00, further less than, or equal to, 9.50, further less than, or equal to, 9.00, or further less than or equal to 5. In one embodiment, or in combination with any one or more embodiments described herein, the ethylene/α-olefin/non-conjugated diene interpolymer may have an MWD greater than, or equal to, 3.00, or greater than, or equal to, 3.25, or greater than, or equal to, 3.50.

The ethylene/α-olefin/non-conjugated diene interpolymer compound may be present in the tie layer blend in an amount from 1 wt. % to 30 wt. %, from 2 wt. % to 10 wt. %, or from 2 wt. % to 5 wt. %.

Furthermore, the blend may optionally comprise a styrene composition. In one embodiment, the styrene composition is a high impact polystyrene (HIPS), which is a styrene polymer containing a grafted rubber component. The rubber component is a copolymer of a rubbery conjugated diene and styrene (rubber copolymer) or a blend comprising both the rubber copolymer and a minor amount of a rubbery conjugated diene homopolymer (rubber homopolymer). The conjugated diene in both rubbers is usually a 1,3-alkadiene, preferably butadiene, isoprene or both butadiene and isoprene, most preferably butadiene. The conjugated diene copolymer rubber may be a styrene/butadiene (S/B) block copolymer. Polybutadiene is a desirable rubber homopolymer.

Various amounts are contemplated for the styrene composition within the blend. For example, the blend may comprise 1 to 30 wt. % styrene, or from 5 to 20 wt. % styrene, or from 5 to 15 wt. % styrene.

As a whole, the tie layer blend may have a melt index of from 1.2 to 8.0 dg/min, and a density of from 0.930 to 0.949 g/cc as measured in accordance with ASTM D792.

Additional compositions and additives are also contemplated to be included in the tie layer. For example, the tie layer may include tackifiers, such as rosins and their derivatives, terpenes and modified terpenes, aliphatic, cycloaliphatic and aromatic resins ($C_5$ aliphatic resins, $C_9$ aromatic resins, and $C_5/C_9$ aliphatic/aromatic resins), hydrogenated hydrocarbon resins and their mixtures, and terpene-phenol resins (TPR), which are used often with ethylene-vinyl acetate adhesives. One suitable hydrogenated hydrocarbon resin is Regalite R1125 available from Eastman Chemical.

Sealant Layer

The multilayer film of various embodiments may optionally include a sealant layer located on the inside layer of a package that is closest to the packaged contents. It also provides a means for sealing or closing the package around the packaged product, such as by heat sealing two portions of the sealant layer together or to the surface of another part of the package, such as sealing a lidding film to a thermoformed packaging component. The composition of the sealant layer is selected to influence the sealing capability of the inside surface layer, for example, to achieve a high sealing bond strength at the lowest possible sealing temperature.

The sealant layer may comprise one or more ethylene acid copolymers having from 0 to 70 mol % of total acid units neutralized with a cation source, a polyethylene plastomer having a density below 0.910 g/cc, and an ethylene-based polymer having a melting point Tm (DSC) of less than or equal to 108° C.

Ethylene acid copolymers having from 0 to 70 mol % of total acids neutralized with a cation source may be referred to as ionomers. The ethylene acid copolymer is a polymerized reaction product of ethylene, a monocarboxylic acid, and a softening comonomer. The monocarboxylic acid can be, for example, acrylic acid, methacrylic acid, or combinations thereof. In various embodiments, the monocarboxylic acid is present in an amount of from 1 wt % to 25 wt %, from 1 wt % to 20 wt %, or from 5 wt % to 15 wt % based on a total weight of the monomers present in the ethylene acid copolymer. In various embodiments, the ethylene content of the ethylene acid copolymer is greater than 50 wt %, or greater than 60 wt %. For example, the ethylene content of the ethylene acid copolymer is from 50 wt % to 95 wt %, from 50 wt % to 90 wt %, from 50 wt % to 85 wt %, or from 60 wt % to 80 wt %.

In various embodiments, the ethylene acid copolymer includes a softening comonomer selected from the group consisting of vinyl esters, alkyl vinyl esters, and alkyl (meth)acrylates. The softening comonomer may be present in an amount from 1 wt % to 40 wt % or 1 wt % to 30 wt %, based on the total weight of the monomers present in the ethylene acid copolymer. In some embodiments, the softening comonomer is alkyl acrylate. Suitable examples of alkyl acrylates include, but are not limited to, ethyl acrylate, methyl acrylate, n-butyl acrylate, iso-butyl acrylate, or combinations thereof. In various embodiments, the alkyl acrylate has an alkyl group with from 1 to 8 carbons.

The ethylene acid copolymer can be prepared by standard free-radical copolymerization methods, using high pressure, operating in a continuous manner. Monomers are fed into the reaction mixture in a proportion which relates to the monomer's activity, and the amount desired to be incorporated. In this way, uniform, near-random distribution of monomer units along the chain is achieved. Unreacted monomers may be recycled. Additional information on the preparation of ethylene acid copolymers including the softening copolymer can be found in U.S. Pat. Nos. 3,264,272 and 4,766,174, each of which is hereby incorporated by reference in its entirety.

The ethylene acid copolymer can be used to produce ionomers by treatment with a cation source. The cation source may be a mono- or divalent cation source, including but not limited to formates, acetates, hydroxides, nitrates, carbonates, and bicarbonates. In various embodiments, the ethylene acid copolymer can be treated with one or more cations of magnesium, sodium, or zinc. In embodiments, from 0 to 70 mol %, from 1 to 70 mol %, from 5 to 60 mol %, or from 10 to 55 mol % of the total acid units of the ethylene acid copolymer are neutralized.

In some embodiments, the ionomer has a density of from 0.930 g/cc to 0.980 g/cc, from 0.940 g/cc to 0.970 g/cc, or from 0.950 g/cc to 0.960 g/cc. In one or more embodiments, the ionomer has a MFR of from 2 g/10 min to 12 g/10 min, from 3.5 g/10 min to 10 g/10 min, or from 5 g/10 min to 8 g/10 min. Commercially available ionomers include those available under the tradename SURLYN® from E. I. du Pont de Nemours and Company.

In the context of this disclosure, the percent neutralization data is presented using the assumption that each cation will react with the maximum number of carboxylic acid groups calculated from its ionic charge. That is, it is assumed, for example, that $Mg^{2+}$ and $Zn^{2+}$ will react with two carboxylic acid groups and that $Na^+$ will react with one.

In some embodiments, the sealant layer includes a linear low density polyethylene plastomer. Polyethylene plastomers may include resins made using single-site catalysts such as metallocenes and constrained geometry catalysts. The polyethylene plastomer has a density below 0.910 g/cc. The density may be, for example, from 0.885 to 0.910 g/cc, from 0.895 to 0.910 g/cc, from 0.900 to 0.910 g/cc, or 0.905 to 0.910 g/cc. In some embodiments, the polyethylene plastomer has a density from 0.885 to 0.907 g/cc.

In some embodiments, the polyethylene plastomer has a melt flow rate (MFR) of up to 20 g/10 minutes. All individual values and subranges up to 20 g/10 minutes are included herein and disclosed herein. For example, the polyethylene plastomer can have a melt index to an upper limit of 1.0, 2.0, 3.0, 4.0, 5.0, 6.0, 7.0, 8.0, 9.0, 10.0, 11, 12, 13, 14, 15, 16, 17, 18, 19, or 20 g/10 minutes. In a particular aspect of the invention, the polyethylene plastomer has an MFR with a lower limit of 0.5 g/10 minutes. One factor in identifying a melt index for the polyethylene plastomer is whether the sealant layer will be manufactured as a blown film or a cast film.

Examples of polyethylene plastomers that can be used in the sealant layer include those commercially available from The Dow Chemical Company under the name AFFINITY™ including, for example, AFFINITY™ PF7266, AFFINITY™ PL 1881G and AFFINITY™ PF1140G.

In still other embodiments, the sealant layer includes an ethylene-based polymer having a melting point Tm (DSC) of less than or equal to 108° C. In some embodiments, the ethylene-based polymer is a linear low density polyethylene (LLDPE). The linear low density polyethylene has a density less than or equal to 0.930 g/cc ($cm^3$). All individual values and subranges less than or equal to 0.930 g/cc are included herein and disclosed herein; for example, the density of the linear low density polyethylene can be from an upper limit of 0.928, 0.925, 0.920 or 0.915 g/cc. In some embodiments, the linear low density polyethylene has a density greater than or equal to 0.870 g/cc. All individual values and subranges between 0.870 and 0.930 g/cc are included herein and disclosed herein.

The ethylene-based polymer has a peak melting point of 108° C. or less in some embodiments, preferably between 70 and 108° C., more preferably between 70 and 99° C.

The melt index of the ethylene-based polymer in the sealant layer can depend on a number of factors including whether the film is a blown film or a cast film. In embodiments where the film is a blown film, the ethylene-based polymer has an MFR of less than or equal to 2.0 g/10 minutes. All individual values and subranges from 2.0 g/10 minutes are included herein and disclosed herein. For example, the ethylene-based polymer can have a melt index from an upper limit of 2.0, 1.7, 1.4, 1.1, or 0.9 g/10 minutes or a lower limit of 0.1, 0.2, 0.3, or 0.4 g/10 minutes.

In other embodiments, the film can be a cast film. In such embodiments, the ethylene-based polymer has an MFR greater than or equal to 2.0 g/10 minutes. All individual values and subranges above 2.0 g/10 minutes are included herein and disclosed herein. For example, the ethylene-based polymer can have a melt index from a lower limit of 2.0, 3.0, 4.0, 5.0, 6.0, or 10 g/10 minutes. In some embodiments, the ethylene-based polymer for a cast film application can have an upper melt index limit of 15 g/10 minutes. In some embodiments, depending on the other components in the multilayer film, the ethylene-based polymer in the sealant layer for a cast film application can have an upper limit of MFR of less than 2.0 g/10 minutes. In some embodiments, the ethylene-based polymer in the sealant layer for a cast film application can have a melt flow rate (MFR) of from 0.1 to 2.0 g/10 minutes, or from 0.5 to 2.0 g/10 minutes. All individual values and subranges from 0.1 to 2.0 g/10 minutes are included herein and disclosed herein.

Examples of ethylene-based polymer that can be used in the sealant layer include those commercially available from The Dow Chemical Company under the names ELITE™ AT including, for example, ELITE™ AT 6101, ELITE™ AT 6202, ELITE™ AT 6410.

Multilayer Films

The multilayer films may be formed and oriented (for example, biaxially oriented) by any suitable process. Information about these processes may be found in reference texts such as, for example, the *Kirk Othmer Encyclopedia*, the *Modern Plastics Encyclopedia*, or the *Wiley Encyclopedia of Packaging Technology*, 2d edition, A. L. Brody and K. S. Marsh, Eds., Wiley-Interscience (Hoboken, 1997). For example, the multilayer films may be formed through dip-coating, film casting, sheet casting, solution casting, compression molding, injection molding, lamination, melt extrusion, blown film including circular blown film, extrusion coating, tandem extrusion coating, or any other suitable procedure. In some embodiments, the films are formed by a melt extrusion, melt coextrusion, melt extrusion coating, or tandem melt extrusion coating process. In some embodiments, the films are formed by thermal lamination or extrusion lamination and coating. Suitable orientation processes include tenter frame technology and machine-direction orientation (MDO) technology.

Optionally, in some embodiments, the multilayer structure may include one or more additional layers, such as one or more core layers and one or more additional tie layers. For example, such additional layers may be positioned between the outer layer and the sealant layer. In one particular embodiment, the multilayer structure may include an outer layer, a core layer, a tie layer, and a sealant layer, and the tie layer is disposed between the core layer and the sealant layer. In some other embodiments, the multilayer structure may include an outer layer, a first tie layer, a core layer, a second tie layer, and a sealant layer, wherein the first tie layer is disposed between the outer layer and the core layer, and the second tie layer is disposed between the core layer and the sealant layer. In some of such embodiments, the outer layer may include an HDPE, and the core layer may include a biaxially oriented polyethylene (BOPE) having a density of from 0.910 to 0.940 g/cc. Other constructions are contemplated.

Moreover, in further embodiments, the multilayer film consist essentially of ethylene-based polymers. As used herein, "consists essentially" means that the multilayer film may include other additives but is limited to ethylene-based polymer. In one or more embodiments, the multilayer film may include at least 90% wt % ethylene based polymer, at least 93% wt % ethylene based polymer, at least 95% wt % ethylene based polymer, at least 97 wt % ethylene based polymer, or at least 99% wt % ethylene based polymer.

It should be understood that any of the layers within a multilayer film of the various embodiments described herein can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

In various embodiments described herein, the multilayer film is a laminate free of solvent-based adhesives, solventless adhesives, and water-borne laminating adhesives. As described above, the multilayer films described herein are imparted with a unique combination of heat resistance, high stiffness, and gloss without the use of adhesives. Additionally, in further embodiments, the multilayer film is free of a primer layer disposed between the first and second layers and the tie layer.

Articles

In various embodiments, the multilayer films disclosed herein can be used to form articles such as packages. Such articles can be formed from any of the multilayer films described herein. Examples of packages that can be formed from multilayer films of various embodiments can include flexible packages, sachets, pouches, stand-up pouches, and pre-made packages or pouches. In some embodiments, multilayer films described herein can be used for food packages, such as packages for meats, cheeses, cereal, nuts, juices, sauces, and the like. Such packages can be formed using techniques known to those of skill in the art based on the teachings herein and based on the particular use for the package (e.g., type of food, amount of food, etc.).

Testing Methods

The test methods include the following:

Density

Samples for density measurement were prepared according to ASTM D4703 and reported in grams/cubic centimeter (g/cc or g/cm$^3$). Measurements were made within one hour of sample pressing using ASTM D792, Method B.

Melt Index ($I_2$)

Melt Index ($I_2$) was measured in accordance with ASTM D-1238 at 190° C. at 2.16 kg. The values are reported in g/10 min, which corresponds to grams eluted per 10 minutes.

Heat Seal Strength

Heat seal strength, or seal strength was measured in accordance with ASTM F1921. The values are reported in N/25 mm.

Bond Strength

In accordance with ASTM F904-91, bond strength was measured using a Zwick tensile tester at a pulling speed of 250 mm/min and with 25 mm width strips. The tensile tester is equipped with a gripper fixture (sample held in a T-shape) to hold two ends of a partially delaminated or partially peeled sample before being pulled apart. The upper gripper that is connected to the crosshead is driven in the tensile direction to measure the force required or bond strength between two adjacent layers of the multilayer sample. Maximum force and average force results are calculated from 5 measurements and recorded in Newtons (N/25 mm strips) units.

Leak Test

In accordance with ASTM D3078-02, the leak test was a test performed on the pillow pouches. The leak tester apparatus supplies a negative pressure and allows the inflated pillow pouch to be submerged in water to detect for any leaks due to the appearance of bubbles exiting the inflated pouch using method. Pouch samples were tested under the following pressure conditions listed in Table 1

TABLE 1

| Pressure Classification | Actual Applied Pressure (kPa) |
|---|---|
| Low | −42.3 |
| Medium | −62.6 |
| High | −83.0 |

EXAMPLES

The following examples illustrate features of the present disclosure but are not intended to limit the scope of the disclosure.

Commercial Polymers Used

The following compositions listed in Table 2 were included in the multilayer examples discussed below. All materials were obtained from The Dow Chemical Company (Midland, MI).

TABLE 2

| Material | Melt Index ($I_2$) g/10 min | Density (g/cc) | Description |
|---|---|---|---|
| BYNEL ® 21E961 | 1.9 | 0.949 | Blend of ethylene acrylate copolymer, and an anhydride grafted ethylene α-olefin copolymer |
| ELITE ™ 5400 | 1.0 | 0.916 | LLDPE |
| ELITE ™ 5401G | 1.0 | 0.918 | LLDPE |
| NUCREL ® 31001 | 1.3 | 0.940 | Ethylene Acrylic Acid Copolymer |
| Elvaloy ® AC 1224 | 2.0 | 0.944 | Ethylene Methyl Acrylate Copolymer |
| BYNEL ® 41E710 | 2.7 | 0.910 | Maleic Anhydride Grafted LLDPE |

Example 1

Inventive Film 1 is a 50 μm monolayer film using BYNEL® 21E961 which was used to study the adhesion between various substrates or layers, as seen in Table 3. Similarly, Comparative Films 1 and 2 are 50 μm monolayer films comprising Elvaloy AC 1224 and a blend of BYNEL® 41E710 with ELITE™ 5400, respectively.

TABLE 3

Various layers/substrates used to evaluate adhesion strength

| Substrate | Thickness (μm) | Corona Treated |
|---|---|---|
| Biaxially Oriented Polypropylene (BOPP) | 18 | Yes |
| Printed BOPP (P-BOPP) | 18 | Yes |
| Biaxially Oriented Polyethylene Terephthalate (BOPET)* | 12 | Yes |

TABLE 3-continued

Various layers/substrates used to evaluate adhesion strength

| Substrate | Thickness (μm) | Corona Treated |
|---|---|---|
| Printed PET (P-PET) | 12 | Yes |
| Metallized Cast Polypropylene (MCPP) | 15 | Yes |
| Aluminum | 7 | No |
| Vapor Metallized PET (VMPET) | 12 | Yes |
| Biaxially Oriented Polyamide (BOPA) | 15 | Yes |

*BOPET films were obtained from Origin Industry Co., Limited (China)

Inventive Film 1 and Comparative Films 1 and 2 were then sandwiched between two of the substrates being evaluated so as to ensure consistency in evaluating the adhesion bond strength between the film and the substrate.

The resulting sandwiched structure was passed through a table top hot roll laminator (Cheminstruments) at 160° Celsius, at 60 PSI of pressure. The resultant laminate was delaminated by hand on one side and the bond strength was evaluated. In cases where corona treatment was utilized, corona treatment to 38 dynes was performed prior to thermal lamination. All experiments were conducted at a roller speed setting of 2, which when calibrated, the speed is as follows, as shown in Table 4.

TABLE 4

| Speed Setting | RPM (tachometer) | Equation | m/min |
|---|---|---|---|
| 2 | | 2.34 | 0.75 |
| 2.5 | | 3.29 | 1.05 |
| 3 | 4.5 | 4.24 | 1.36 |
| 4 | 6.3 | 6.15 | 1.97 |
| 5 | 7.8 | 8.05 | 2.58 |
| 6 | 10 | 9.96 | 3.19 |
| 7 | 11.4 | 11.87 | 3.80 |
| 8 | 13.5 | 13.77 | 4.41 |
| 9 | 16 | 15.68 | 5.02 |
| 10 | 17.8 | 17.58 | 5.63 |

The results for the force required to separate one side of the substrate from Inventive Film 1 is provided in Table 5. The results for the force required to separate one side of the substrate from Comparative Film 1 (Elvaloy AC 1224) and Comparative Film 2 (BYNEL® 41E710 blended with ELITE™ 5400) are provided in Tables 6 and 7 respectively. All bond strength is measured in newtons (N). The bond strength values are an average of 5 tests.

TABLE 5

| Structure | Bond Strength (N 15/min) |
|---|---|
| BOPP//Inventive Film 1//BOPP | 2.94 |
| P-BOPP//Inventive Film 1//P-BOPP | 2.83 |
| BOPET//Inventive Film 1//BOPET | 1.37 |
| BOPET//Inventive Film 1//BOPET | 1.33 |
| P-PET//Inventive Film 1//P-PET | 1.07 |
| MCPP//Inventive Film 1//MCPP | 0.89 |
| Aluminum//Inventive Film 1//Aluminum | 2.95 |
| VMPET//Inventive Film 1//VMPET | 1.36 |
| BOP A///Inventive Film 1//BOPA (160° C.) | 1.41 |
| BOP A//Inventive Film 1//BOPA (180° C.) | 2.14 |

The results demonstrate that Inventive Film 1 can adhere well to BOPP, Printed BOPP, BOPET, Printed PET, and BOPA. However, the best performance can be observed with Aluminum, where a force of 2.94 N is observed. For general applications, an adhesive strength of 2N should be adequate. Thus, BYNEL® 21E961 can provide bond strengths to many different substrates at around 2N (BOPA, Aluminum, BOPP).

In comparison to the BYNEL® 21E961, which is a blend of ethylene acrylate copolymer and anhydride grafted ethylene α-olefin copolymer, provided below are bond strengths for Comparative Films 1 and 2, which comprise ethylene acrylate copolymer (Elvaloy AC 1224) and anhydride grafted grafted ethylene α-olefin copolymers (BYNEL® 41E710 blended with ELITE™ 5400), respectively. As shown in Tables 6 and 7, the bond strengths of Comparative Films 1 and 2 were evaluated on various substrates at a temperature of 160° C.

TABLE 6

| Structure | Bond Strength (N 15/min) |
| --- | --- |
| BOPP//Comparative Film 1//BOPP | 0.437 |
| P-BOPP//Comparative Film 1//P-BOPP | 2.677 |
| BOPET//Comparative Film 1//BOPET | 7.543 |
| P-PET//Comparative Film 1//P-PET | 3.387 |
| PA//Comparative Film 1//PA | 4.46 |

TABLE 7

| Structure | Bond Strength (N 15/min) |
| --- | --- |
| BOPP//Comparative Film 2//BOPP | 0.173 |
| P-BOPP//Comparative Film 2//P-BOPP | 0 |
| BOPET//Comparative Film 2//BOPET | 0.147 |
| P-PET//Comparative Film 2//P-PET | 0.167 |
| PA//Comparative Film 2//PA | 0.427 |

As shown in Table 7, the bond strength was poor for Comparative Film 2, which included anhydride grafted ethylene α-olefin copolymer. Referring to Table 6, Comparative Film 1 (Elvaloy AC 1224) suitably adhered to PET, PA, P.PET, but not BOPP. Only Inventive Film 1, which included a blend of ethylene acrylate copolymer and anhydride grafted ethylene α-olefin copolymer could synergistically achieve suitable adhesion to BOPP as well as suitable adhesion to the other substrates.

Example 2

To further demonstrate the adhesion performance, three side seal pillow pouch structures were fabricated. The pillow pouches had 80 mm by 80 mm dimensions with a 5 mm edge seal alone three sides. All pouches were heat sealed using a Jade PFS-600 impulse sealer using a setting of 3 on the temperature knob. The pouches comprised the following layer structures listed in Table 8 as follows.

TABLE 8

Layer Structures for Pouches

| Pouch Samples | Outer Layer | Tie Layer | Sealant Layer |
| --- | --- | --- | --- |
| Inventive Pouch | BOPET | BYNEL ® 21E961 (50 μm) | ELITE ™ 5401G (50 μm) |
| Comparative Pouch 1 | BOPET | Adhesive (Adcote 545S) (2.8 GSM) | ELITE ™ 5401G (50 μm) |
| Comparative Pouch 2 | BOPET | NUCREL ® 31001 (50 μm) | ELITE ™ 5401G (50 μm) |

The Inventive Pouch and Comparative Pouch 2 are produced by the experimental thermal lamination procedure listed above. Thermal lamination is performed in a two stage process, i.e., apply BYNEL® 21E961 or NUCREL onto to the PET layer, and then apply the ELITE™ 5401G.

When performing a qualitative visual analysis of the pouches, Comparative Pouch 2 had a lot of wrinkles on the surface, because NUCREL® 31001 has a poor adhesion strength to PET, i.e., only about 0.3 N to 0.5 N. This poor adhesion strength caused delamination, which was demonstrated in the wrinkled layer. The Inventive Pouch, which included the BYNEL® 21E961 tie layer, demonstrated similar wrinkle level to Comparative Pouch 1, which is an adhesive laminated conventional pouch, because the BYNEL® 21E961 adheres well to PET.

All three pouches in Table 8 were then subjected to a leak test. As shown in Table 9 below, the Inventive Pouch is the only pouch that passed all pressure conditions of the leak test.

TABLE 9

Leak Test Performance

| Pouch Sample | Low Pressure | Medium Pressure | High Pressure |
| --- | --- | --- | --- |
| Inventive Pouch | Pass | Pass | Pass |
| Comparative Pouch 1 | Pass | Pass | Fail |
| Comparative Pouch 2 | Fail | Fail | Not attempted |

As shown in Table 10, the thermal laminated Inventive Pouch surprisingly showed improved leak test performance over Comparative Pouch 1, which used laminating adhesives. This result is further collaborated by the seal strength results shown in Table 11 below, which are comparable or superior to normal traditionally fabricated laminates such as Comparative Pouch 1. As shown, the Inventive Pouch has a much greater seal strength than Comparative Pouch 1 at temperature of 110° C. and greater.

TABLE 11

Seal Strength Data for Inventive Pouch and Comparative Pouch 1

| Temperature (° C.) | Inventive Pouch Seal Strength (N) | Comparative Pouch 1 Seal Strength (N) |
| --- | --- | --- |
| 900 | 0.38 | 0.384 |
| 100 | 1.67 | 15.9 |
| 110 | 47.99 | 17.5 |
| 120 | 60.53 | 20.2 |
| 130 | 58.30 | 20.6 |
| 140 | 65.96 | 21.8 |
| 150 | 73.87 | 24 |

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer film for a flexible packaging article comprising:
   a first layer;
   a second layer; and
   a tie layer positioned between the first layer and the second layer, the tie layer comprising a blend having from 70 to 85% by weight of an ethylene acrylate copolymer, and an anhydride grafted ethylene α-olefin copolymer;

wherein at least one of the first layer and the second layer are individually selected from the group consisting of polypropylene (PP), polyethylene terephthalate (PET), polyethylene (PE), polyamide (PA), aluminum, and combinations thereof, wherein the multilayer film is formed by thermal lamination.

2. The multilayer film of claim 1, wherein both the first layer and the second layer are individually selected from the group consisting of PP, PET, PE, PA, aluminum, and combinations thereof.

3. The multilayer film of claim 1, wherein at least one of the first layer and the second layer are uniaxially oriented or biaxially oriented.

4. The multilayer film of claim 1, wherein the first layer or second layer comprises a PE sealant layer.

5. The multilayer film of claim 1, wherein the blend further comprises ethylene/α-olefin/non-conjugated diene interpolymer.

6. The multilayer film of claim 1, wherein the blend further comprises a styrene composition.

7. The multilayer film of claim 1, wherein the ethylene acrylate copolymer comprises ethylene (meth)acrylate.

8. The multilayer film of claim 1, wherein the ethylene acrylate copolymer has an acrylate comonomer content of 5 to 40% by weight.

9. The multilayer film of claim 1, wherein the blend has a melt index of from 1.2 to 8.0 dg/min.

10. The multilayer film of claim 1, wherein the blend has a density of from 0.930 to 0.949 g/cc as measured in accordance with ASTM D792.

11. The multilayer film of claim 1, wherein the blend comprises from 5 to 20% by weight of anhydride grafted ethylene α-olefin copolymer.

12. The multilayer film of claim 1, wherein the anhydride grafted ethylene α-olefin copolymer has an anhydride grafting level from 0.1 to 2.5 wt %.

13. The multilayer film of claim 1, wherein the multilayer film is free of a primer layer disposed between the first and second layers and the tie layer.

14. The multilayer film of claim 1, wherein at least one of the first layer and the second layer is uniaxially oriented or biaxially oriented, in direct contact with the tie layer, and comprises polypropylene.

15. A multilayer film for a flexible packaging article consisting of:
   a first layer;
   a second layer; and
   a tie layer positioned between the first layer and the second layer, the tie layer comprising a blend having ethylene acrylate copolymer, and an anhydride grafted ethylene α-olefin copolymer; wherein
   the first and second layers are monolayers; and
   at least one of the first layer and the second layer are individually selected from the group consisting of polypropylene (PP), polyethylene terephthalate (PET), polyethylene (PE), polyamide (PA), aluminum, and combinations thereof,
   wherein the multilayer film is formed by thermal lamination.

16. The multilayer film of claim 15, wherein the tie layer comprises from 70 to 85% by weight of the ethylene acrylate copolymer and from 5 to 20% by weight of the anhydride grafted ethylene α-olefin copolymer.

17. A multilayer film for a flexible packaging article comprising:
   a first layer;
   a second layer; and
   a tie layer positioned between the first layer and the second layer, the tie layer comprising a blend having ethylene acrylate copolymer, and an anhydride grafted ethylene α-olefin copolymer;
   wherein at least one of the first layer and the second layer are individually selected from the group consisting of polypropylene (PP), polyethylene terephthalate (PET), polyethylene (PE), polyamide (PA), aluminum, and combinations thereof and
   wherein the multilayer film is a laminated film formed by thermal lamination, and free of primers and adhesives.

\* \* \* \* \*